United States Patent [19]
Hastings

[11] 3,933,146
[45] Jan. 20, 1976

[54] PORTABLE SINGLE BURNER CAMPSTOVE

[75] Inventor: Thomas C. Hastings, Willowdale, Canada

[73] Assignee: The Coleman Company, Inc., Wichita, Kans.

[22] Filed: Mar. 12, 1975

[21] Appl. No.: 557,761

[52] U.S. Cl. .................................. 126/38; 126/44
[51] Int. Cl.² ...................................... F24C 5/20
[58] Field of Search .................. 126/38, 44, 40, 9; 431/344

[56] References Cited
UNITED STATES PATENTS

| | | | |
|---|---|---|---|
| 3,400,705 | 9/1968 | Axelsson | 126/44 |
| 3,538,907 | 11/1970 | Bowman et al. | 126/38 |
| 2,825,325 | 3/1958 | Ross | 126/44 |
| 3,896,784 | 7/1975 | Baxter | 126/38 |

*Primary Examiner*—Edward G. Favors

[57] ABSTRACT

The portable single burner campstove of this invention is characterized by wind resistance and high efficiency. The cooking unit, which can be mounted on top of a support stand, includes a reflector bowl, a burner within the reflector bowl, and grate means for supporting a cooking utensil over the burner. In addition, there is provided a burner bowl within the reflector bowl and surrounding the burner. The utensil supporting grate is formed from a plurality of vertically-oriented strips of sheet metal, the lower portions of which extend downwardly into the burner bowl and the reflector bowl for cooperating therewith to increase the heat transferred to the cooking utensil and to reduce the adverse effect of crosswinds on such transfer. Preferably, where the burner is gas-fired, it is mounted on an adjustable support stand, so that different size gas bottles may be used with the stove, legs of adjustable inclination forming one side of the support and a bottle of fuel gas the other side.

8 Claims, 9 Drawing Figures

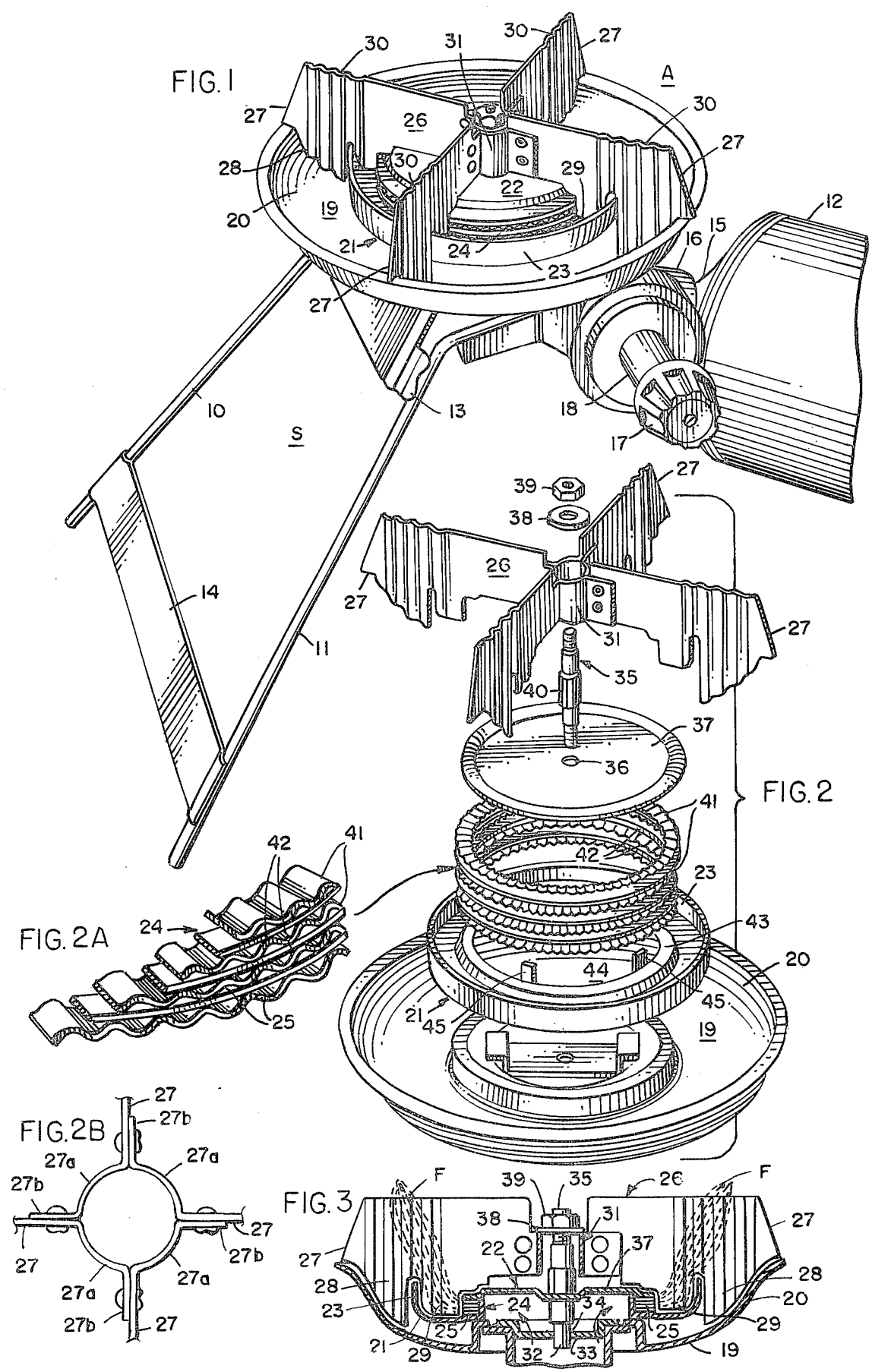

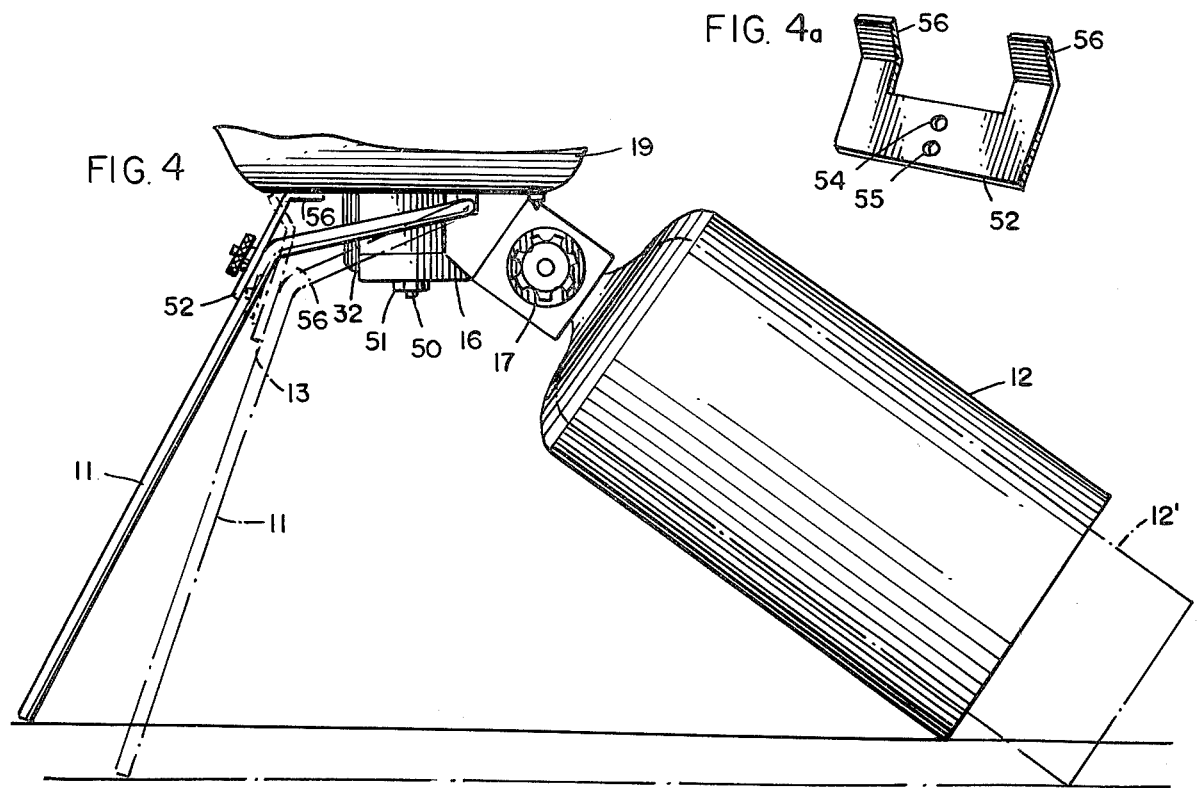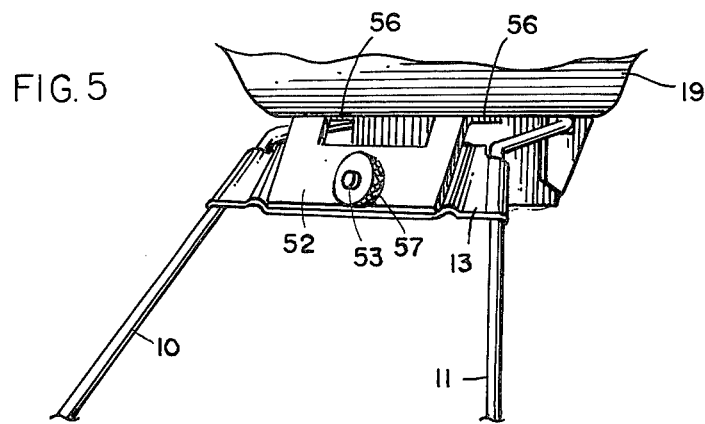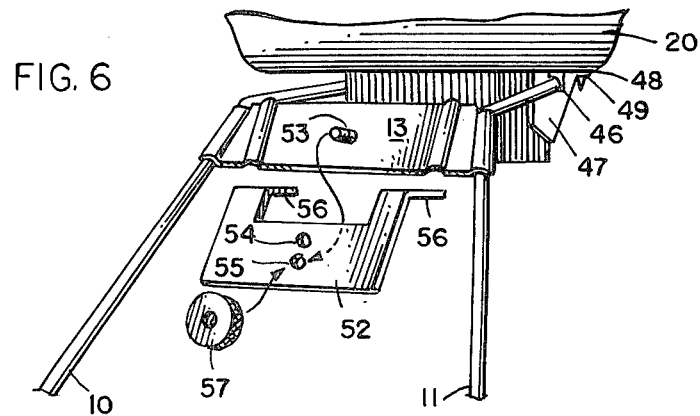

PORTABLE SINGLE BURNER CAMPSTOVE

This invention relates to portable single burner campstoves of the kind which can be adapted for use with bottles of liquified propane or other similar gaseous fuels. Portable gas-fired campstoves of the general kind with which the features of the present invention can be employed are shown in U.S. Pat. 3,405,703 and Canadian Pat. No. 869,306. Certain features of the present invention can also be used with liquid fuel-fired campstoves.

Such campstoves may include a support with a cooking unit mounted on top thereof. As shown in Canadian Pat. No. 869,306, the support stand can comprise a bottle of gaseous fuel, the cooking unit being mounted on top of the bottle. In another arrangement, a support stand may comprise inclined legs, and may include the fuel bottle as one side of a triangular support. (See U.S. Pat. No. 3,405,703). Where the bottle of fuel forms one side of the support stand, the fuel bottle should have a certain predetermined length in order to support the cooking unit, or more particularly the grate elements thereof, in a generally horizontal alignment for supporting the cooking utensil, such as pan or skillet. While the improved cooking unit assembly of this invention can be employed with support stands like those of the prior art, which either do not provide very stable support, or which are not adapted to use with gas bottles of different size or length, it is preferred to provide a support stand which includes leg means of adjustable inclination on one side so that gas cylinders of variable length may be used on the other side.

As will be appreciated by those knowledgeable in the art, campstoves of the kind to which the present invention are directed do not transfer the burner heat to the cooking utensil as efficiently as is desirable. This problem is particularly acute when the stove is used under cross-wind conditions, as it frequently will be at a campsite or on a picnic. Larger portable campstoves, such as the two burner-type portable stoves, are usually provided with wind screens, consisting of the upturned lid and outwardly folded side flaps, and the stoves can be positioned so that the upturned lid is against the direction of the wind. However, with the portable single burner stoves of the kind with which the present invention is concerned, it is not practical to provide such wind screens around the burner unit. The present invention is therefore concerned with modifications of the burner unit itself to increase its inherent wind resistance and promote high efficiency of heat transfer.

Heretofore, some efforts have been made to solve the problem just described. Grate members have been utilized which provide some wind resistance, but these have been employed in conjunction with conventional burners, such as the mushroom-type burners, which have a dome shape with perforations in the dome providing the gas ports. The use of a reflector bowl with such combination has also been of some benefit, but has still fallen short of a satisfactory solution to the problem. The present invention therefore for the first time provides the combination of a special burner unit, burner bowl, reflector bowl, and wind baffle grate, which is capable of achieving a highly efficient heat transfer from the burner to the cooking utensil even under extremely adverse wind conditions.

THE DRAWING

The accompanying drawings, which form a part of this specification, illustrate a preferred embodiment of the cooking unit assembly and an adjustable support stand therefor. It will be understood that like reference characters are intended to be employed to designate like parts throughout the drawings and their description.

FIG. 1 is a perspective view of a campstove including a support stand (the gas cylinder of the stand being partially broken away) and a cooking unit assembly mounted on top of the stand;

FIG. 2 is a perspective exploded view of the components of the cooking unit as shown in FIG. 1;

FIG. 2A is a fragmentary perspective view of the tubular assembly which provides the burner ports;

FIG. 2B is a fragmentary top view of the central portion of the grate;

FIG. 3 is a transverse sectional view of the assembled cooking unit;

FIG. 4 is a side elevational view of the campstove of FIG. 1, illustrating particularly the adjustability of the support stand which permits the stove to be used with gas cylinders of different lengths or diameters;

FIG. 4A is a perspective view of the support bracket in the position shown in dotted lines in FIG. 4;

FIG. 5 is a perspective view of the adjustable leg assembly and reflector bowl, the upper part of the cooking unit being broken away; and FIG. 6 is a perspective view similar to FIG. 5, except that the components of the adjustable support bracket are shown removed.

Looking first at FIG. 1, there is shown a cooking unit assembly A mounted on top of a support stand S. The stand S includes a pair of inclined legs 10 and 11 and an inclined bottle of gaseous fuel 12. Legs 10 and 11 are connected by cross-braces 13 and 14. Bottle 12 includes a reduced neck portion 15 which is provided with external threads and screws into a valve housing 16. A rotatable manual control is provided by the knob 17, which operates a valve shaft extending through tubular housing 18 for permitting gaseous fuel to be supplied to the burner A, as is well-known in the art.

The cooking unit includes an outer reflector bowl 19, which is open-topped and has an upwardly curving outer wall portion 20. The inner surface 19 of reflector bowl 20 is preferably made heat-reflective, such as by polishing the surface thereof, or providing a mirror-like finish by plating, such as with nickel or chrome. If desired, the reflector bowl may be formed of polished aluminum, plated cold rolled steel, or polished stainless steel. Not only does the reflector bowl serve to reflect heat upwardly toward the cooking utensil, but it also tends to limit the radiation of heat downwardly to the space below the burner assembly.

According to the present invention, there is also provided a burner bowl 21 which is mounted within the reflector bowl 19 and surrounds the burner 22. The burner bowl 21 is open-topped, and has an outer upwardly extending wall 23 which is located intermediately between the burner 22 and the reflector bowl side wall 20.

Burner 22 provides a tubular side wall 24 in opposed relation to the burner bowl wall 23. Burner side wall 24 provides a multiplicity of flame ports distributed therearound and arranged to direct the flame jets outwardly toward the burner bowl wall for impingement thereon.

The desired configuration is shown in FIG. 3, where the ports 25 in burner wall 24 direct jets of flame against the burner bowl wall 23, which deflects the flames upwardly. This is indicated diagrammatically by the flame representations F.

In accordance with the present invention, there is also provided a grate designated generally by the number 26. Grate 26 as shown includes four vertically oriented strips of sheet metal extending outwardly from the central portion of the assembly over the burner 22, the burner bowl 21, and the reflector bowl 19. The number of such grate strips may vary from 3 to 6, but 4 strips are preferred. As shown more clearly in FIG. 3, the upper edges of the strips 27 are in generally horizontally alignment to supportingly receive a cooking utensil without undue tilting. The lower portions of the strips 27 extend downwardly into the interior of the burner bowl 21 and the reflector bowl 19, as shown particularly in FIGS. 1 and 3. Preferably, the outer lower portions 28 extend downwardly into close proximity with the adjacent inner surface of the upwardly curving wall portion 20 of the reflector bowl. Also, it is preferred that the inner lower portions 29 of the strips 27 extend downwardly within the burner bowl 21 into close proximity with the inner bottom surface thereof and with the adjacent inner surface of wall portion 23. This preferred "profile" is believed to optimize the desired wind baffling effect of the strip members 27 in the assembled grate.

To increase their stiffness, grate strips 27 may have their outer portions corrugated, as indicated at 30, but this is not essential. If desired, strips 27 may be formed of heavier metal without corrugations. A suitable material of construction if aluminized cold rolled steel sheet. The burner bowl 21 may also be formed of cold rolled steel, and may be aluminized or tin plated. However, such materials of construction are merely advantageous and not essential.

Preferably, the strips 27 are arranged radially, evenly spaced, and intersect near their central portions where they are united to form an integrated grate unit. One convenient way of uniting the strips 27 is to provide their inner ends with integral offset ring sections 27a, which terminate in outwardly extending attachment tabs 27b. The attachment tabs 27b can be connected to the adjacent sides of the nearest adjoining strip 27 by spot welding, riveting, etc. In the illustration given, two rivets are shown as forming the attachment between each of the strips 27 and the tabs 27b. The ring sections 27a in the united structure therefor form a vertically extending tubular section at the center of the grate. This tubular section, which is designated generally by the number 31, can be utilized to locate and retain the grate. One preferred method of accomplishing this is shown in FIG. 3. Across the open upper end of the burner box 32 there is weldably attached a transverse strap 33 which has a threaded opening 34 in the center thereof. Into opening 34 the lower threaded end of a stud 35 is received. This stud extends upwardly through the center of the burner 22 projecting through a central opening 36 in the burner cover plate 37. As can be seen in FIG. 3, the lower end of stud 35 is thereby mounted below the burner 22, while extending through the burner and projects thereabove for receiving the grate ring 31. The threaded upper end of stud 35 preferably projects above ring 31, and is secured thereto by means of a washer 38 and a nut 39. This assembly not only clamps the grate 26 in place, but also clamps together the components of the burner 22, the burner bowl 21 and the reflector bowl 20. The central portion of the stud 35 can be provided with an integral nut 40, as shown, which bears against the top wall 37 of the burner 22, thereby locking together the burner assembly. (See FIG. 3).

The individual components of the burner 22 are shown more clearly in FIGS. 2 and 2A. In a preferred embodiment, the tubular side wall 24 of the burner is formed from an assembly of rings, comprising alternating corrugated rings 41 and flat rings 42. The corrugated rings 41 thereby provide a multiplicity of vertically and horizontally distributed gas ports 25 through which the flame jets emerge and are directed against the outer wall 23 of the burner ring 21. To assist in centering the rings 41, 42, the inner portion of the bottom of burner ring 21 may be provided with an annular ridge 43 for receiving the lowermost of the rings 41, 42.

If desired, there may also be provided around the central opening 44 in the burner ring 21 a plurality of circumferentially spaced upwardly-extending locator tabs 45. (See FIG. 2). Such tabs, however, are not essential. Conveniently, four such locater tabs can be provided and arranged about 90° apart. The assembly of the rings 41, 42 therefor fits over the tabs 45 so as to locate them in centered relation over ridge 43. As will be noted, the top burner plate 37 is imperforate except for the center hole 36 through which the stud 35 extends. With this construction, the flame jets are initially directed primarily outwardly, but are then deflected upwardly toward the cooking surface of the burner by means of the burner bowl wall 23.

Looking now at FIGS. 4 to 6, it can be seen that the pair of legs 10, 11 have their upper ends pivotally connected through slots 46 to attachment bracket 47. Bracket 47 is secured to the underside of reflector bowl 19 by a sheet metal screw 48 extending through the bottom of the reflector bowl 19 which engages a tab 49 portion of the bracket. The lower portion of the bracket itself is connected to the bottom of the burner box 32 by means of a threaded stud 50 and a nut 51.

The pivoted leg means 10, 11 provide a support of adjustable inclination on one side, which cooperates with the gas bottle 12 on the other side. Where a longer and/or smaller diameter gas bottle is used, such as bottle 12', means are provided permitting the legs 10, 11 to be adjusted in inclination to compensate for the different gas cylinder. (See FIG. 4.)

One convenient way of accomplishing this compensating adjustment is by means of a variable position bracket 52. At the center, cross brace 13 can be provided with an outwardly extending threaded stud 53 which selectively receives one of the two vertically spaced openings 54, 55 arranged along the center line of the bracket 52. Bracket 52 can provide upwardly extending angular support tabs 56, the inwardly extending end portion of which supportingly engages the underside of reflector bowl 19. (See FIGS. 4 and 5.) It will be apparent therefore that when the upper opening 54 of bracket 52 is placed on stud 53, and secured thereon by means of the threaded attachment ring 57 that the inclination of the legs 10, 11 will be correspondingly greater with respect to the vertical than when the lower opening 55 is received on the stud 53. The bracket 52 can also be reversed, as indicated by the showing in dotted lines in FIG. 4 and in solid perspective of FIG. 4A, thereby providing additional positions of greater or lesser inclination for legs 10, 11. One position for a shorter and larger diameter bottle 12 is indicated in solid lines in FIG. 4. Bottle 12 may be a 16.4 ounce bottle of liquified propane fuel. As indicated in FIG. 6, the opening 55 is used. For a longer and smaller diameter bottle 12', such as a 14.1 ounce bottle, the bracket 52 is reversed and opening 54 is used. Such 16.4 and 14.1 ounce bottle are standard in the United States and Canada. If desired, a position of still greater inclination can be provided by removing or inverting bracket 52, thereby permitting the top edge of cross brace 13 to supportingly engage the underside of reflector bowl 19.

OPERATION

In operation, the cooking unit is set-up, as illustrated in FIGS. 1 and 4, the inclination of the legs 10, 11 being adjusted to cooperate with the size and diameter of bottle 12, 12', etc., so that the cooking unit A is disposed in generally horizontal alignment. In particular, the upper edges of the grate strips 27 should be approximately horizontally aligned so that the grate will supportingly receive a cooking utensil, such as a skillet or pot, without undue tilting. Once the campstove is properly set-up, the valve operator 27 is rotated to open the valve and admit gas from the gas cylinder to the interior of the burner box 32. In FIG. 3, the flow arrows indicate the gas flow from the cylinder into the open interior of the burner assembly 22. The gas then flows outwardly through the multiple ports 25 in the tubular side wall of the burner 24. The gas jets are lit, and the rate of gas flow is adjusted to produce a flame condition somewhat as shown in FIG. 3. It should be recognized that the illustration of the flames F are diagrammatic, but the showing does indicate that the flames issuing from the ports 25 designedly impinge on the bottom and outer sidewall of the burner bowl 21. The high velocity flames are thereby turned upwardly to project against the bottom of the cooking utensil resting on the grate 26. The flames are thus given a positive but diffused impingement against the bottom of the cooking utensil, which impingement condition is highly effective for direct transfer of heat from the flames to the cooking utensil.

The cooking unit A not only operates with high efficiency in still air conditions, but maintains good efficiency even in cross wind conditions, which would ordinarily seriously interfere with the transfer of heat from the burner to the cooking utensil. This compares with the conventional constructions of the prior art where even relatively light winds can blow between the cooking utensil and the burner, and prevent the flames and hot combustion gas from reaching the utensil. Such constructions, therefore, have been relatively useless except in still air conditions, which are rarely encountered in outdoor use of portable campstoves.

The high degree of wind resistance is provided by cooperation between several components of the baffle grate 26; including the strips 27, and the downward projections of these strips into the burner bowl 21 and the reflector bowl 19. Both of these bowls are thereby effectively divided up into segments, within which air is prevented from blowing across or around the top of the burner. The burner bowl itself also acts as a wind baffle, the outer wall 23 thereof shielding the gas emission ports 25 from cross wind coming from any direction. It is therefore apparent that this construction renders the burner combination of this invention much more wind resistant than the common mushroom burner, where the gas outlet ports are directly exposed to wind action.

A further feature of the construction is that the gas flames impinge on the burner bowl bottom and the upwardly turned wall portion 23, heating the burner bowl so that it will glow red and emit intense infra-red heat. Such radiation will be directed, in general, onto the bottom of the cooking utensil, and will further enhance the transfer of heat. In addition, radiation from the outside surfaces of the burner bowl is reflected onto the heat-reflective inner surface of the reflector bowl 19, which directs the reflected heat upwardly toward the cooking utensil. Preferably, the curved outer portion 20 of the reflector bowl 19 has a generally parabolic curvature to maximize the reflection of heat in an upward direction toward the cooking utensil. Infra-red heat radiated from the burner bowl 21 or reflected from the reflector bowl 20 will not be influenced by wind action, and this conjoint action of the components in increasing the transfer of heat as infra-red radiation further improves the wind resistance of the cooking unit. The combined results, therefore, is that the total cooking unit provides for much greater efficiency in conveying heat energy from the burner to the cooking utensil than has been provided by any prior art system, and under both still air and wind conditions.

The feature of the present invention which relate to the burner unit, particularly the features which provide increased wind resistance, are applicable to campstoves burning liquid fuel. In accordance with the usual practice, the liquid fuel, such as gasoline, will be vaporized in a generator tube, and the resulting fuel vapor can be conveyed to the interior of the burner unit. The operation of the burner will then be comparable to that previously described, and advantage may be taken of the combination of the grate and burner which increases the wind resistance and increases the transfer of heat from the burner to the cooking utensil. It will be understood that the particular liquid fuel is not critical, and that any conventional liquid fuel can be employed, such as gasoline, naptha, or kerosine. A storage reservoir for the liquid fuel will be provided, which can be pressurized, as is known in the art, for supplying the liquid fuel to the vapor generator. With such systems, as employed in combination with the grate and burner of the present invention, an important advantage will be that the vapor generator can be located in the area of the burner having the greatly improved wind resistance. As will be appreciated by those skilled in the art, it is important that the generator be kept heated under adverse wind conditions, thereby assuring optimum flow of vaporized liquid fuel to the burner.

The embodiments of the invention in which an exclusive property or privilege is claimed are defined as follows:

1. In a portable single burner campstove, the combination providing increased wind resistance and high efficiency, comprising: a cooking unit assembly including a reflector bowl providing an upwardly extending outer wall portion, a burner within said reflector bowl, and grate means for supporting a cooking utensil over said burner, a burner bowl having an outer upwardly extending wall intermediately located between said burner and said reflector bowl wall portion, said burner providing a tubular side wall in opposed relation to said burner bowl wall and having a multiplicity of flame ports distributed therearound and arranged to direct flame jets outwardly toward said burner bowl wall for impingement thereon, said grate means including at least three vertically oriented strips of sheet metal extending outwardly from the central portion of said assembly over said burner, burner bowl, and reflector bowl, the upper edges of said strips providing support for a cooking utensil, said strips having portions extending downwardly into said burner bowl and said reflector bowl for cooperating with said burner bowl wall and said reflector bowl wall portion to increase the heat transferred to the cooking utensil and to reduce the effect of crosswinds on such transfer.

2. The campstove of claim 1 in which said strips have their inner ends connected to form a unitary grate, and the strips extend downwardly into close proximity with the inside surfaces of said burner bowl and said reflector bowl.

3. The campstove of claim 1 in which said grate strips have their inner ends connected to form a ring, and there is also provided a vertical stud having a lower end mounted below said burner, said stud extending through the center of said burner and projecting thereabove for receiving said grate ring, and means are provided for releaseably connecting said ring to the upper end portion of said stud.

4. The campstove of claim 1 in which the outer portions of said strips are corrugated and the inner ends thereof provide integral offset sections of a ring, each ring section terminating in an outwardly extending attachment tab, said tabs being respectively connected to the adjacent side of the nearest adjoining strip to unify said strips into an integral grate with a ring at the center thereof.

5. The campstove of claim 1 which includes a support stand, said cooking unit being mounted on top of said stand, and said support stand including a gas cylinder for supplying fuel gas to said burner.

6. The campstove of claim 5 in which said support stand includes leg means of adjustable inclination on one side and a gas cylinder on the other, whereby the inclination of said legs can be adjusted to compensate for gas cylinders of varying length.

7. The campstove of claim 6 in which said leg means include two legs having a cross brace at the upper ends thereof beneath said reflector bowl, and a bracket is mounted on said cross brace to extend thereabove for supporting engagement with said reflector bowl, said bracket being connected to said cross brace by adjustable means permitting said bracket to be raised or lowered with respect to its projection above said cross brace, thereby providing said inclination adjustment.

8. A portable single burner campstove characterized by wind resistance and high efficiency, said campstove being of the kind having a support stand with a cooking unit assembly mounted on top of said stand, said assembly including a reflector bowl providing an upwardly extending outer wall portion, a burner within said reflector bowl, and grate means for supporting a cooking utensil over said burner, wherein the improvement comprises in combination a burner bowl mounted within said reflector bowl around said burner, said burner bowl having an outer upwardly extending wall intermediately located between said burner and said reflector bowl wall portion, said burner providing a tubular side wall in opposed relation to said burner bowl wall and having a multiplicity of flame parts distributed therearound and arranged to direct flame jets outwardly toward said burner bowl wall for impingement thereon, said grate means comprising four vertically oriented strips of sheet metal extending ouwardly from the center of said assembly over said burner, burner bowl, and reflector bowl, said strips being equally spaced and arranged radially to form quandrants therebetween, the upper edges of said strips being horizontally aligned to supportingly receive a cooking utensil, said strips providing portions extending downwardly into said burner bowl and said reflector bowl, said portion extending into said reflector bowl extending to a position of close proximity to the inner surface of said reflector bowl outer wall portion, the portion of said strips extending into said burner bowl, extending downwardly to a position of close proximity with the inner surface of the bottom of said reflector bowl and the inner surface of the outer wall of said reflector bowl, said flame ports causing said flame jets to impinge on said burner bowl wall, and said burner bowl wall deflecting said flame jets upwardly toward the upper edge portions of said strips.

* * * * *